United States Patent
Watanabe et al.

[11] Patent Number: 5,937,143
[45] Date of Patent: Aug. 10, 1999

[54] TEACHING PENDANT FOR A ROBOT

[75] Inventors: Atsushi Watanabe; Tomoyuki Terada, both of Oshino-mura; Hirotsugu Kaihori, Kyoto; Tatsuya Oumi; Shinsuke Sakamoto, both of Oshino-mura, all of Japan

[73] Assignee: Fanuc, Ltd., Yamanashi, Japan

[21] Appl. No.: 08/836,752

[22] PCT Filed: Sep. 18, 1996

[86] PCT No.: PCT/JP96/02688

§ 371 Date: Jul. 10, 1997

§ 102(e) Date: Jul. 10, 1997

[87] PCT Pub. No.: WO97/10931

PCT Pub. Date: Mar. 27, 1997

[30] Foreign Application Priority Data

Sep. 18, 1995 [JP] Japan ................................ 7-238469

[51] Int. Cl.$^6$ .............................. B25J 9/16; G05B 19/42; G05B 19/48
[52] U.S. Cl. ................................. 395/99; 395/92
[58] Field of Search .................... 395/99, 92, 80; 901/3, 42; 318/568.13, 568.1, 568.25

[56] References Cited

U.S. PATENT DOCUMENTS

| | | | |
|---|---|---|---|
| 3,920,972 | 11/1975 | Corwin, Jr. et al. | 395/86 |
| 4,815,011 | 3/1989 | Mizuno et al. | 395/99 |
| 4,831,548 | 5/1989 | Matoba et al. | 395/99 |
| 4,979,128 | 12/1990 | Seki et al. | 395/99 |
| 4,998,050 | 3/1991 | Nishiyama et al. | 395/99 |
| 5,046,022 | 9/1991 | Conway et al. | 901/50 |
| 5,079,491 | 1/1992 | Nose et al. | 395/99 |
| 5,488,689 | 1/1996 | Yamato et al. | 395/99 |
| 5,705,906 | 1/1998 | Tanabe et al. | 395/99 |

FOREIGN PATENT DOCUMENTS

| | | |
|---|---|---|
| 0 278 421 | 8/1988 | European Pat. Off. . |
| 0 411 498 | 2/1991 | European Pat. Off. . |
| 0 455 817 | 11/1991 | European Pat. Off. . |
| 60-20881 | 2/1985 | Japan . |
| 60-44282 | 3/1985 | Japan . |
| 62-1005 | 1/1987 | Japan . |
| 63-89279 | 4/1988 | Japan . |
| 1-97591 | 4/1989 | Japan . |
| 1-100203 | 7/1989 | Japan . |
| 1-269105 | 10/1989 | Japan . |
| 2-15284 | 1/1990 | Japan . |
| 5-66825 | 3/1993 | Japan . |
| 6-55476 | 3/1994 | Japan . |
| 6-99377 | 4/1994 | Japan . |
| 6-344279 | 12/1994 | Japan . |
| 2 270 788 | 3/1994 | United Kingdom . |
| 90-00273 | 1/1905 | WIPO . |

OTHER PUBLICATIONS

Kubota Kazunari, et al.; Method For Teaching Robot Track; Apr. 12, 1994; Abstract of Japanese Publication No. 06099377 A.

European Patent Office Comminication for Application No. 96 931 245.3–2302 dated Apr. 7, 1998.

*Primary Examiner*—Robert W. Downs
*Attorney, Agent, or Firm*—Staas & Halsey

[57] ABSTRACT

The invention is a robot teaching pendant containing a display device with graphic display capabilities. Display data is displayed on the graphic display and includes the movement of a robot and taught points. This display data is generated by a display data generation unit based on robot programs stored in data storage unit by buffering the data from a robot controller. This display data may also include representative images of the robot tool along with its coordinates in a tool coordinate system and the taught points in a user or world coordinate system. Thus, the action of the robot can be visually recognized with ease, and the robot can be taught easily and accurately.

20 Claims, 9 Drawing Sheets

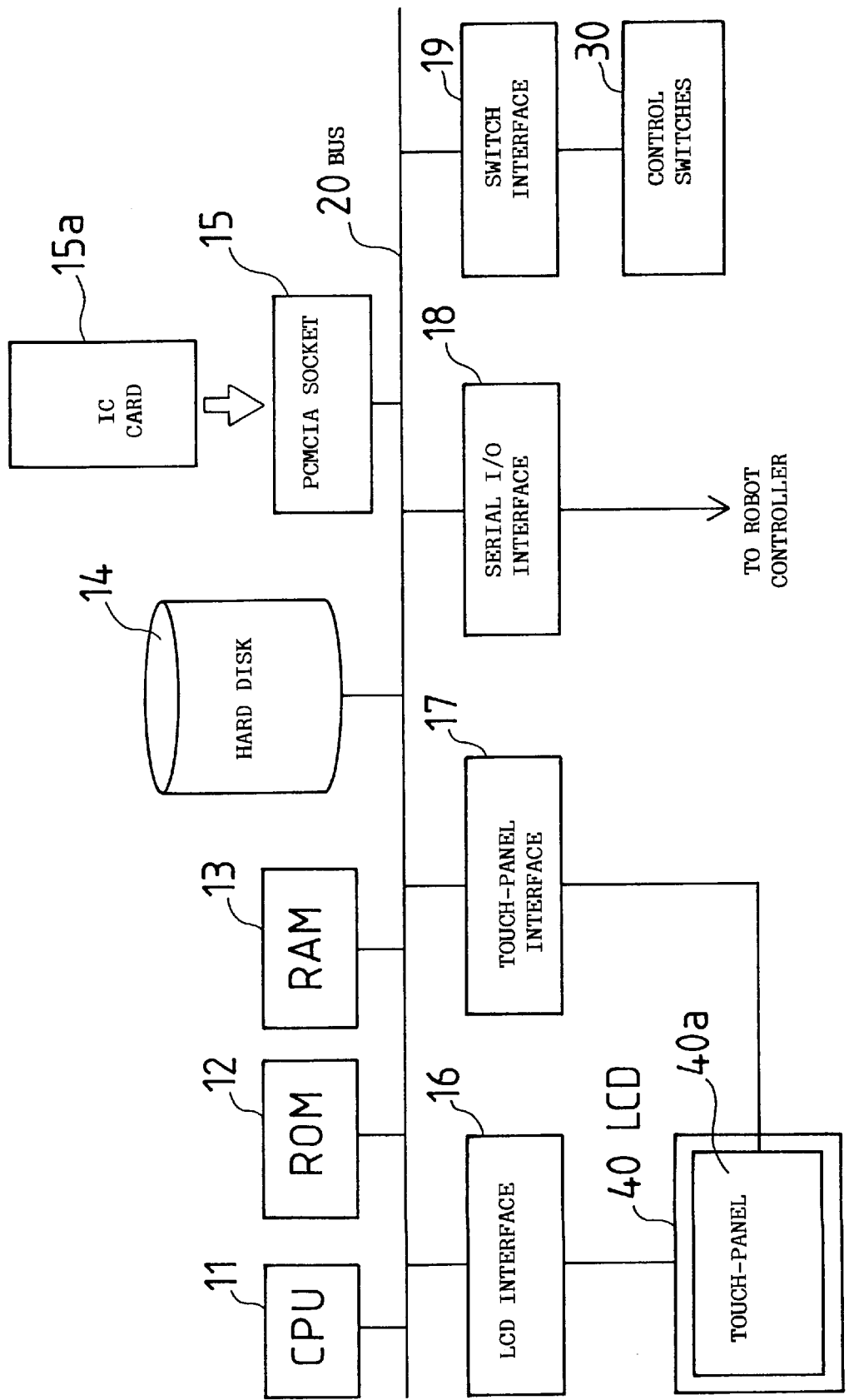

TEACHING PENDANT FOR A ROBOT

TECHNICAL FIELD

The present invention relates to a robot teaching pendant for teaching arid controlling a robot.

BACKGROUND ART

Each robot teaching pendant is usually provided with an operator panel for teaching, character-based display device, etc. The robot is taught and operated by using such teaching pendants while watching the motion of a robot arm.

Such a character-based display device is capable of displaying only alphabet letters, figures, Chinese characters, and Japanese characters but not capable of graphically displaying the spatial relations among taught points and the like, su that it is difficult for an operator to have intuitive recognitions. Although the spatial position and motion of the robot arm are expected to be displayed graphically, they can be expressed only in numerical values or the like. Thus, it has been no easy matter for the operator to operate the robot using a robot teaching pendant.

DISCLOSURE OF THE INVENTION

The object of the present invention is to provide a robot teaching pendant capable of displaying the motion of a robot, whereby robot operation can be recognized visually.

In order to achieve the above object, a robot teaching pendant according to the present invention comprises: at least one of data storage unit for temporarily storing robot programs from a robot controller and a unit for reading a robot programs within the robot controller one by one; display data generating unit for generating display data from the robot programs; a display device for graphically displaying the display data generated by the display data generating unit; and an operator panel for operating the robot.

Further, this robot teaching pendant comprises a unit for converting three-dimensional data of the robot programs into two-dimensional data which can be obtained by projecting the three-dimensional data in a specific viewing direction, in order to display the three-dimensional data in two dimensions on the screen of the display device.

These display data include position data on taught points, coordinate data according to a tool coordinate system for the tool center point (TCP) of the robot at each taught point, data on the current position of the robot, and the like.

Preferably, the display device is provided with a touchpanel on the display screen thereof, and an operation command for moving the robot to the position of one specified taught point is generated by operation command generating means when the one taught point, among the taught points displayed on the screen of the display device, is specified through the touch-panel.

Further, the robot teaching pendant comprises movement plane specifying unit for specifying a plane on which the taught points move, and operation command generating means which, specifying one of the taught points which are displayed on the screen of the display device by using the touch-panel and also specifying the moving direction, cause the robot to move on the plane including said specified taught point, specified by said movement plane specifying means, in response to specifying operations of the taught points and moving direction.

According to the robot teaching pendant of the present invention, as described above, a graphic display function is provided and is designed so that three-dimensional display data, such as the three-dimensional movement of the robot and taught points, can be displayed in two dimensions in a manner such that an operator can easily confirm them by watching the display. As a result, the action of a robot can be recognized visually and with ease, so that easy and accurate teaching operation can be performed.

BRIEF DESCRIPTION OF DRAWINGS

FIG. 9 is a diagram showing an example of a hardware configuration for carrying out the present invention.

BEST MODE FOR CARRYING OUT THE INVENTION

Figure 1:
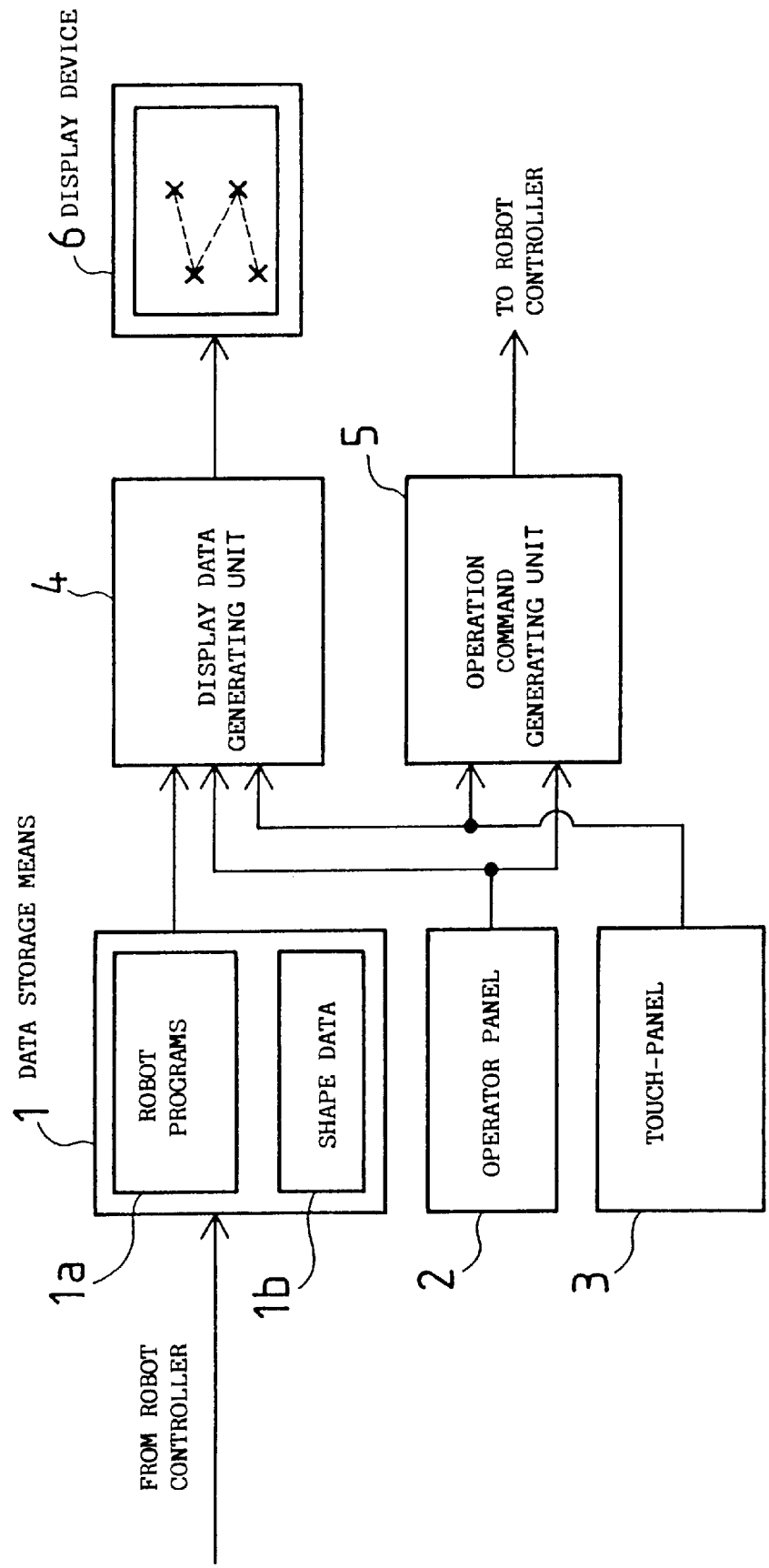
FIG. 1 is a block diagram showing elements that constitute a robot teaching pendant according to the present invention.

Referring first to the block diagram of FIG. 1, a composition of a robot teaching pendant according to the present invention will be described.

A robot program 1a for operating a robot delivered from a robot controller is temporarily stored in data storage unit 1. The data storage unit 1 stores the shape data indicative of various shapes, such as the shape of a workpiece member, shape of the robot, shape of peripheral equipment, etc., besides the robot program 1a read from the robot controller. Based on this robot program 1a, a display data generating means 4 generates display data indicative of, e.g., teaching points and a path for the robot, delivers the generated display data to a display device 6, and causes the display device 6 to graphically display the taught points. Furthermore, based on shape data 1b stored in the data storage unit 1, the display data generating means 4 causes the display device 6 to display the robot shape and the like. The robot programs 1a may be read with remote control one by one directly from the robot controller without being temporarily stored in the data storage means 1. In this case, a block designated by numeral 1 serves as program reading means.

Teaching or operation of a robot is carried out through an operator panel 2. The operator panel 2 is furnished with an emergency stop button and control switches, in the form of jog buttons and the like, for manual operation of the robot.

The operation of the control switches on the operator panel 2 is applied to the input of operation command generating means 5, and delivered as an operation command to the robot controller. Also, the operation is applied to the input of the display data generating unit 4, converted into display data indicative of the operating conditions of the robot, and displayed on the display device 6.

A touch-panel 3 is fitted on the display screen of the display device 6. By touching the touch-panel 3 with a finger tip, an operator can select or indicate menu buttons or taught points displayed on the display screen. Since this touch-panel 3 is also used as an operation input unit such as jog buttons other than the emergency stop button and deadman switch, it may be connected to the display data generating means 4 or the operation command generating unit 5 for operating the robot.

Figure 2:
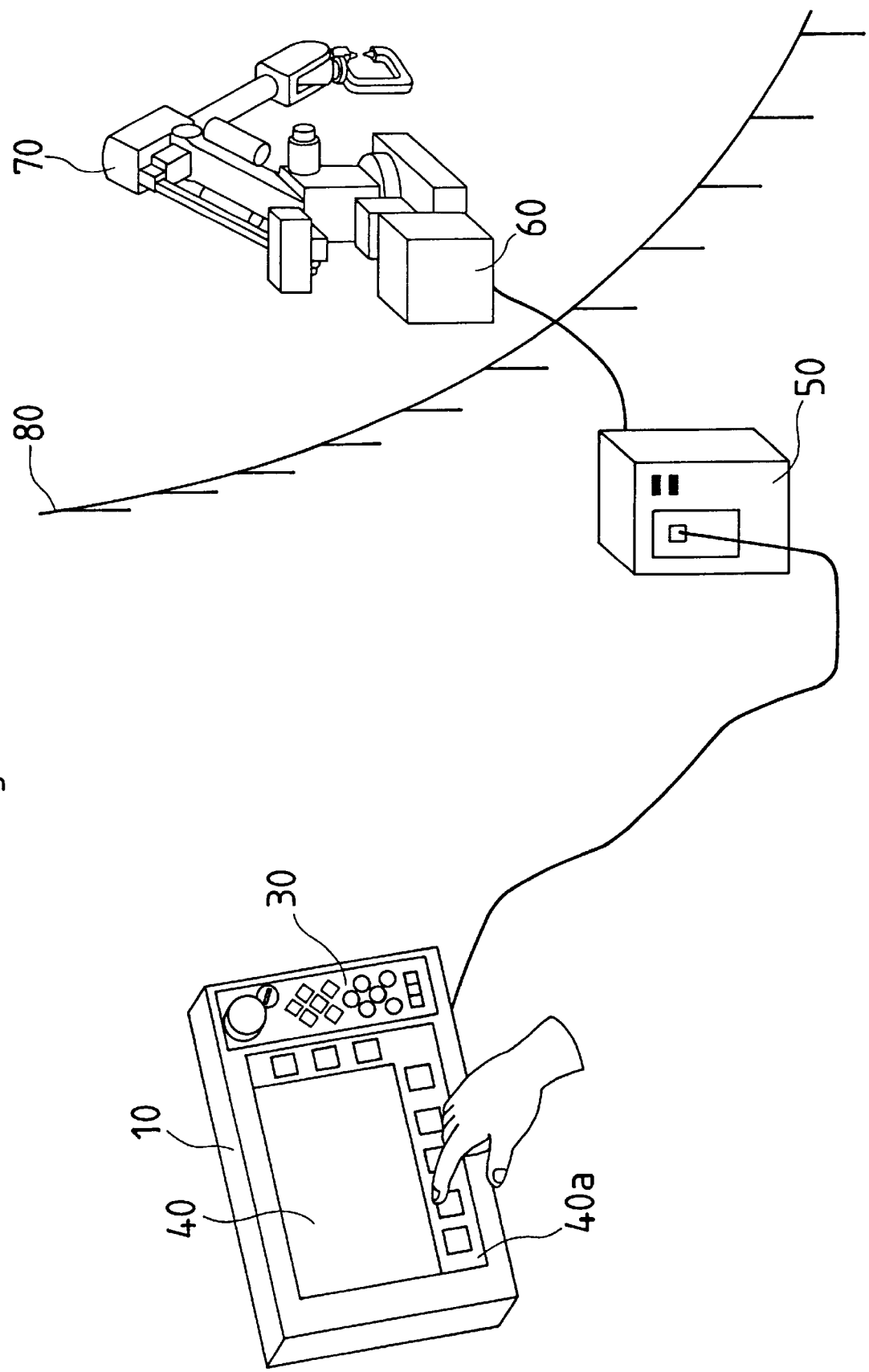
FIG. 2 is a diagram schematically illustrating a state in which a robot is taught or operated through a robot teaching pendant according one embodiment of the present invention connected to a robot controller.

Referring now to FIG. 2, described schematically is a state in which the robot is taught or operated through a robot teaching pendant according one embodiment of the present invention connected to the robot controller.

A robot teaching pendant 10 comprises control switches 30 used for manually operating or teaching the robot, a graphic display device 40 capable of graphic displaying, and a touch-panel 40a attached to the display screen of the graphic display device 40. This robot teaching pendant 10 is connected to a robot controller 60, which is located adjacent to a robot mechanical section 70, through an operation box 50 that is located outside a safety fence 80. The operation box 50 is a remote operation unit that can separately operate operating parts, e.g., a power switch, emergency switch, etc., of the robot controller 60, from outside the safety fence 80. Carrying the robot teaching pendant 10, the operator can watch the movement of an arm of the robot mechanical section 70 on the other side of the fence as he operates the touch-panel 40a and the control switches 30 to teach the robot or manually operate the robot.

Figure 3:
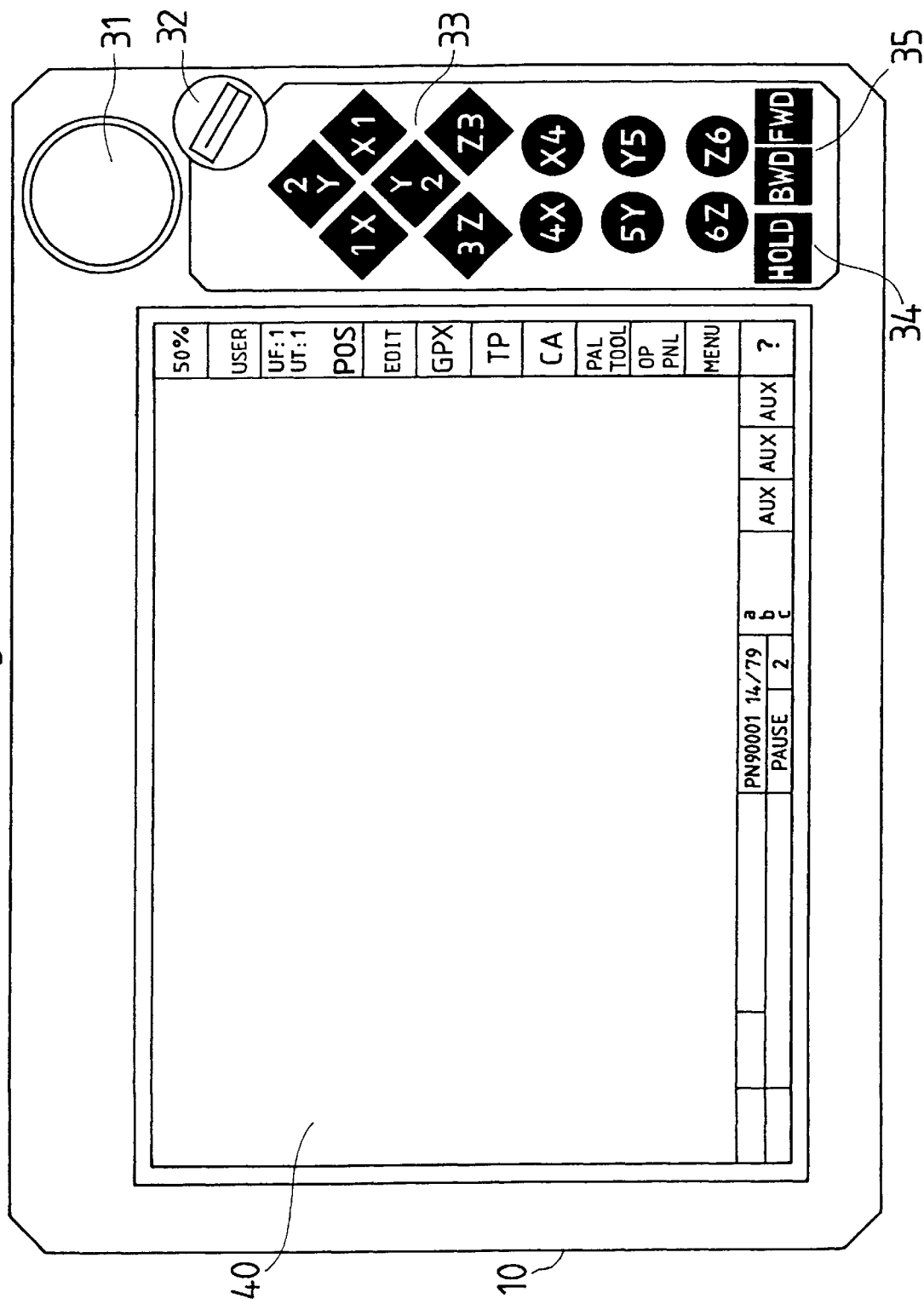
FIG. 3 is a diagram showing the details of the external appearance of the robot teaching pendant which is schematically shown in FIG. 2.

FIG. 3 shows the details of the robot teaching pendant 10 which is schematically shown in FIG. 2.

The robot teaching pendant 10 comprises the graphic display device 40, and an operator panel located on the right of the device 40 is provided with various control switches. More specifically, an emergency stop button 31, teaching pendant enabling switch 32, jog buttons 33, hold key (HOLD) 34, and forward and backward keys 35 (keys FWD and BWD) are arranged, and moreover, a deadman's switch is provided on the back of this robot teaching pendant 10. The emergency stop button 31 is used to stop the robot in case of emergency, while the teaching pendant enabling switch 32 enables the robot teaching pendant 10 to carry out jog feed, programming, and testing and disable it for safety's sake in other cases. The jog buttons 33, which serve for manual operation of the robot, include keys for specifying the feed in the X-, Y-, and Z-axis directions and rotation around the individual axes. The hold key 34 is used to interrupt the execution of the program, thereby suspending the operation of the robot, while the forward and backward keys 35 are used to start the program, thereby actuating the robot.

The graphic display device 40 is provided with the touch-panel 40a on its display screen. By touching any spot on the screen with a finger tip, the operator can enter position information on the screen, corresponding to the touched spot, into the robot teaching pendant 10. Several keys displayed at the right-hand and lower ends on the display screen of the graphic display device 40 are not hard keys but main menus that are always displayed in those positions on the screen. If any of them is fingered, the corresponding menu function is selected. Among these keys, USER is a user key; POS, posture key; EDIT, edit key; GPX, graphic key; TP, torch posture key; CA, interference avoidance key; PAL TOOL, pallet tool key; OP PNL, operator panel key; MENU, menu key; AUX, auxiliary key; and PAUSE, pause key.

Figure 4:
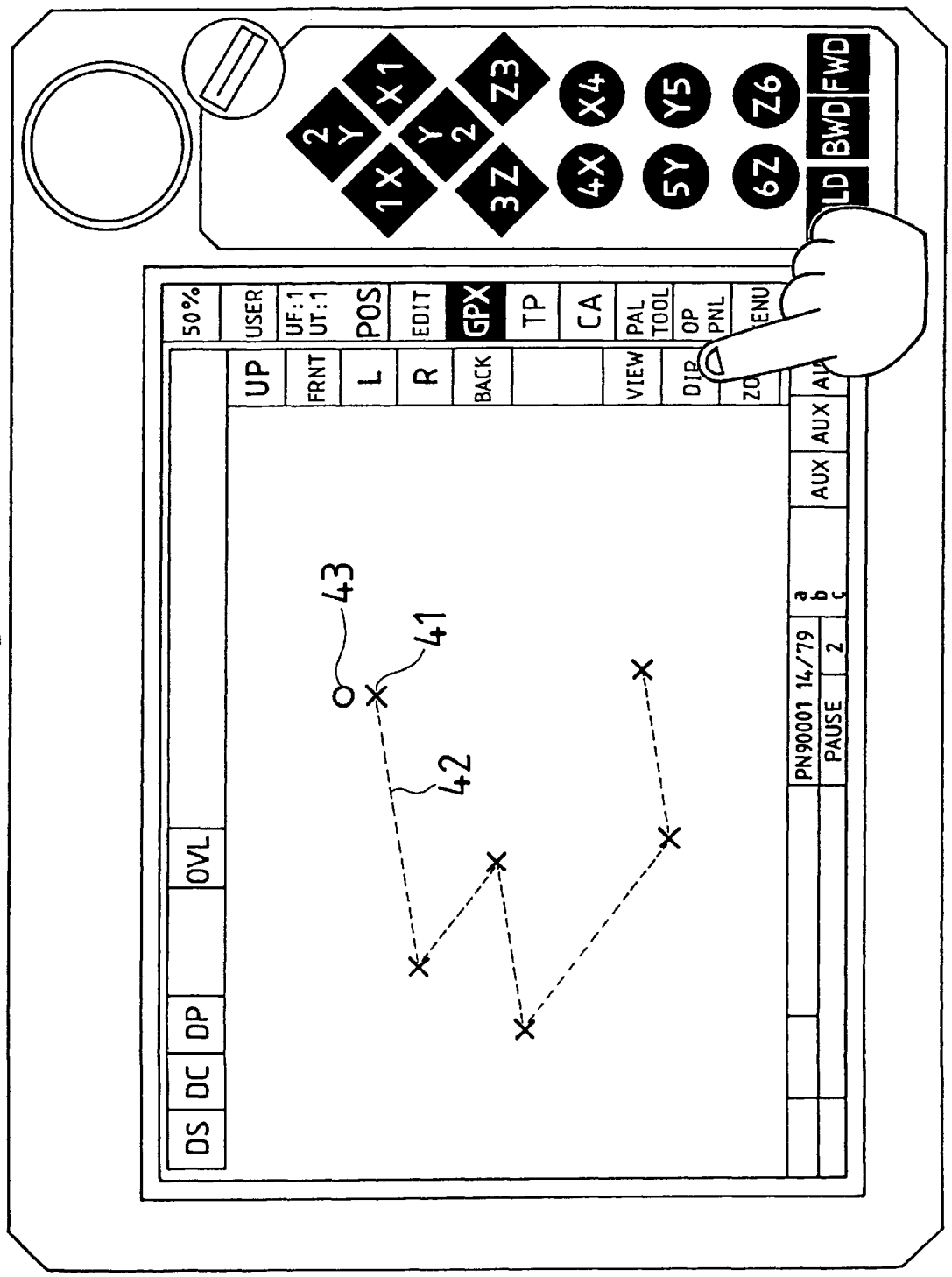
FIG. 4 is a diagram showing a first display example displayed on a graphic display device of the robot teaching pendant shown in FIG. 3.
Figure 5:
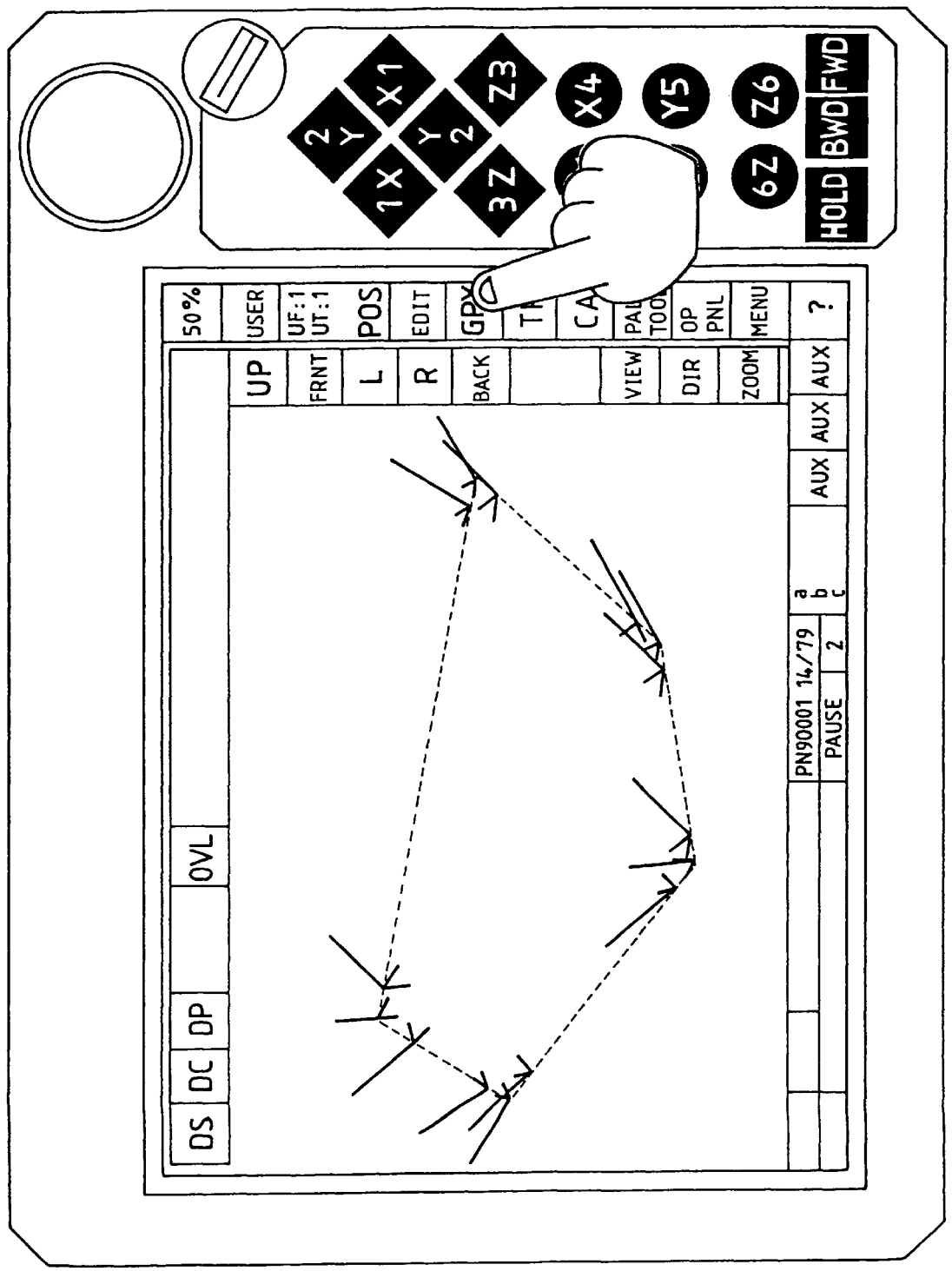
FIG. 5 is a diagram showing a second display example displayed in like manner to that of FIG. 4.
Figure 6:
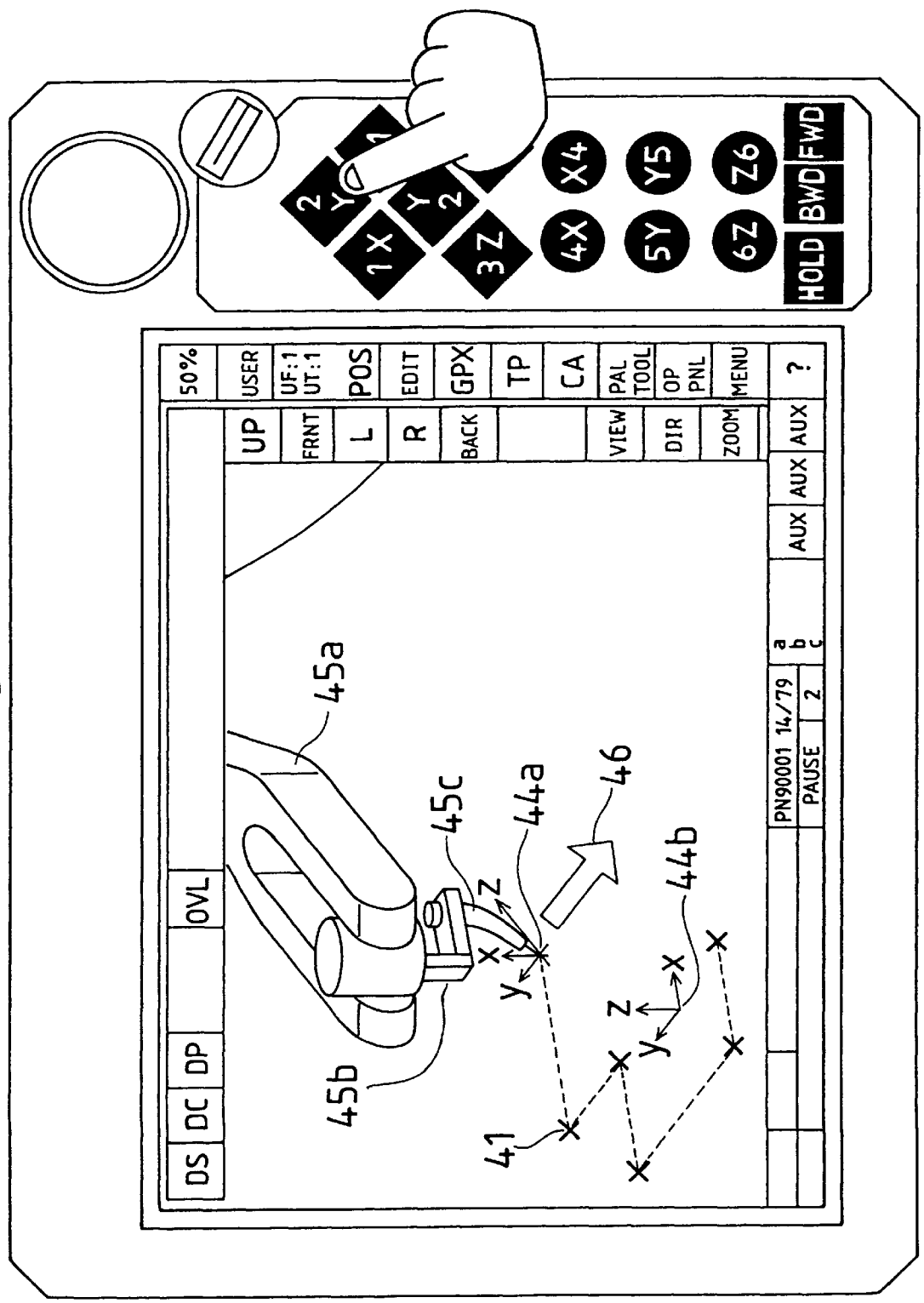
FIG. 6 is a diagram showing a third display example displayed in like manner to that of FIG. 5.

Described referring to FIGS. 4, 5 and 6 are examples displayed on the graphic display device 40 of the robot teaching pendant 10 shown in FIG. 3.

In the example shown in FIG. 4, taught points 41 are displayed on the display screen of the graphic display device 40 on the basis of three-dimensional data in buffered robot programs from the robot controller. The three-dimensional data are displayed by using three-dimension-to-two-dimension conversion data that are obtained by projecting the three-dimensional data from specified viewpoints on a two-dimensional plane. Here the taught points 41 are represented by symbol "x". A path 42 that extends past these taught points 41 are displayed with broken lines, whereby three-dimensional display in a certain viewing direction is made possible. At the same time, the current position of the robot can also be displayed. In this case, a current tool center point coordinates (TCP coordinates) 43 of the robot is distinguished from the taught points 41 by symbol "○" as it is displayed. In this manner, the taught points 41 of the robot programs can be graphically displayed in three dimensions, and, if necessary, the current position of the robot, that is, the current TCP coordinate 43 of the robot can be displayed at the same time. Among the keys appearing on the screen of the display device 40 in FIG. 4, DS is for shape display; DC, for coordinate system display; DP, for taught point display; OVL, for overlapping; UP, for upward; FRONT, for front; L, for left; R, for right; BACK, for back; VIEW, for viewpoint; DIR, for viewing direction; and ZOOM, for enlargement.

In the example shown in FIG. 5, coordinate axes 44 are displayed for each of the taught points 41 of the robot programs displayed on the display screen of the graphic display device 40. The coordinate axes 44 are represented by three lines, X-, Y-, and Z-axes, whereby the coordinate axes 44 of a tool coordinate system for the TCP of the robot at each taught point 41 are displayed. As the coordinate axes 44 are displayed on each taught point, the posture of the robot at each taught point 41 can be identified.

In the example shown in FIG. 6, a shape near the TCP of the robot is graphically displayed on the display screen of the graphic display device 40, together with the taught points 41 of the robot programs. In FIG. 6, a robot arm 45a, a torch holder 45b, and a torch 45c, as well as the taught points 41 of the robot programs, are displayed on the display screen of the graphic display device 40. Thus, the operator can recognize the taught points 41 and the postures of the torch 45c at the taught points 41 in three dimensions.

Besides the shape near the TCP of the robot, the respective shapes of the peripheral equipment and the workpiece member may be displayed on the display screen of the graphic display device 40. Furthermore, in the case where coordinate axes 44a of a tool coordinate system for the TCP or coordinate axes 44b of a user coordinate system or the base (not shown) of the robot, for example, is displayed, coordinate axes of a world coordinate system can be simultaneously displayed in the vicinity of the base.

Furthermore, in a jog feed mode, when the jog button is depressed to move the robot manually, an arrow 46 indicative of the direction of action of the robot corresponding to a depressed jog button is displayed before the robot actually operates. Alternatively, in a jog feed confirmation mode, the arrow 46 indicative of the direction of action of the robot corresponding to a depressed jog button may be displayed instead of actual operation of the robot when the jog button is depressed. By doing so, the behavior of the robot can be confirmed on the graphic display device 40 before the robot actually operates.

Furthermore, in a program testing mode, an arrow indicative of the direction in which the robot starts to operate is displayed before the robot actually begins to move when a test is executed to try to reproduce the robot programs, that is, when the forward or backward key (key AD or RT) is depressed, in the same shape as the arrow 46 to be displayed when a jog is executed, for example.

Figure 7:
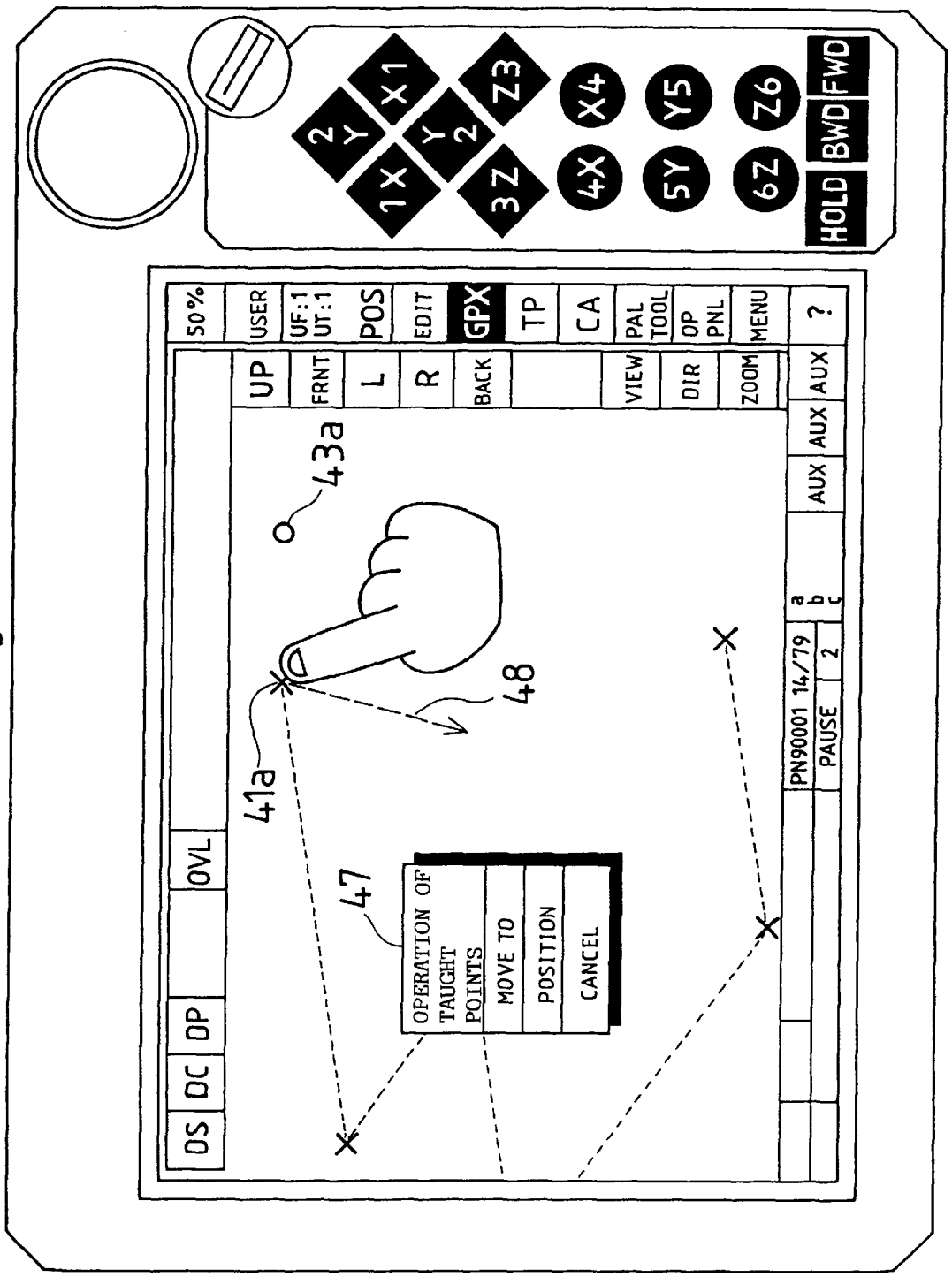
FIG. 7 is a diagram showing a state in which one of taught points of robot programs displayed on the display screen of the graphic display device of the robot teaching pendant of FIG. 3 is specified and moved on the display screen.
Figure 8:
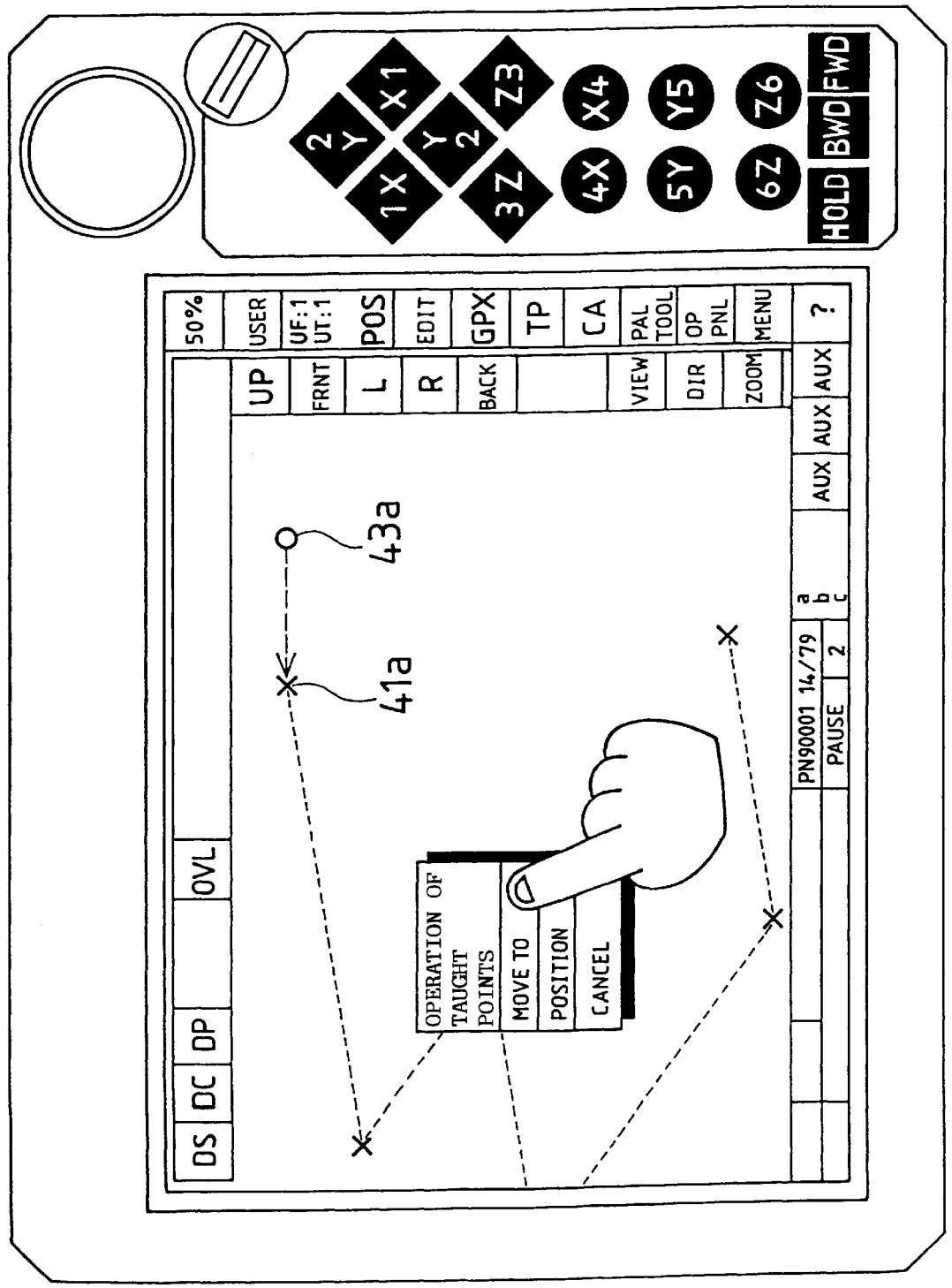
FIG. 8 is a diagram showing a state in which a point specified by using a pop-up menu displayed on the display screen of the graphic display device of the robot teaching pendant of FIG. 3 is moved.

Referring now to FIGS. 7 and 8, an operation for specifying one of the taught points 41 of the robot programs displayed on the display screen of the graphic display device 40 will be described.

If one taught point 41a, among the taught points displayed on the graphic display device 40, is selected and its corresponding spot is fingered, the touch-panel recognizes the taught point 41a from a display coordinates of the fingered spot of the screen. Thereupon, a pop-up menu 47 for "OPERATION OF TAUGHT POINT" appears on the screen. If "MOVE TO" is specified from the pop-up menu 47, that is, if the part of the pop-up menu 47 for "MOVE-MENT" is touched, the current position (TCP position) of the robot can be moved to the specified taught point 41a. Let it be supposed, for example, that the current position of the robot is represented by a symbol of "○" that is designated by numeral 43a on the display screen of the graphic display device 40. In this case, if "MOVE TO" is commanded, as shown in FIG. 8 after the taught point 41a is fingered, then the robot will be actually moved to the taught point 41a, and at the same time, the symbol "○" displayed on the screen will also move toward the taught point 41a, as indicated by the dotted-line arrow in FIG. 8.

Specifying by fingering one of the taught points being displayed on the graphic display device 40 and moving the finger, keeping contact with the touch-panel, in a direction as indicated by an arrow 48, the taught point 41a will move to the destination of the finger, following the movement of the finger. It is necessary, however, to specify in advance the plane on which the taught point moves before the operation for moving the taught point is carried out. For example, a plane perpendicular to the viewing direction or a plane to be defined by three-point designation or the like is specified in advance. After the plane for taught point movement is first defined, the taught point is then specified. When this taught point is moved on the screen, this results in that the taught point has moved on the previously defined plane including the taught point. Further, in response to this movement of the taught point. the robot can be moved following the movement of the taught point within the previously defined plane.

Referring now to FIG. 9, an example of the hardware configuration of the robot teaching pendant 10 will be described.

The robot teaching pendant 10 comprises a processor (CPU) 11, a read-only memory (ROM) 12, a main memory (RAM) 13, a hard disk device 14, a PCMCIA socket 15, conforming to the PCMCIA (Personal Computer Memory Card International Association) standard, provided for loading an IC card 15a, a liquid crystal display (LCD) interface 16, a touch-panel interface 17, a serial input/output (I/O) interface 18 to be connected to the robot controller 60 through the operation box 50, and a switch interface 19. These components are connected to one another by means of a bus 20.

The robot teaching pendant 10 further comprises a liquid crystal display device 40 connected to the liquid crystal display (LCD) interface 16, a touch-panel 40a connected to the display surface of the liquid crystal display device 40 and to the touch-panel interface 17, and the control switches 30 connected to the switch interface 19.

The processor 11 generally controls the robot teaching pendant 10. The read-only memory 12 is stored with a program necessary for starting up the robot teaching pendant 10. Developed in the main memory 13 are programs necessary for teaching operation for the robot, data necessary for screen display, etc. The hard disk device 14 is loaded with an operating system, application programs for instructing the execution and editing of the robot programs, and the like. The IC card 15a is stored with, for example, the robot programs. The robot a teaching pendant 10 can be enabled to fetch the robot programs by loading the IC card 15a into the PCMCIA socket 15. Further, the robot programs can be loaded into the robot controller through the serial input/output interface 18.

The control switches 30, which are connected to the switch interface 19, include an emergency stop button, teaching pendant enabling switch for enabling the robot a teaching pendant to carry out jog feed and the like, jog buttons for the manual operation of the robot, a hold key for interrupting the execution of the program to suspend the operation of the robot, forward and backward keys for starting the program to actuate the robot, and a deadman switch for enabling the teaching pendant while depressed during the operation of a robot and performing an emergency stop when released of depressed with a force greater than a predetermined value.

We claim:

1. A robot teaching pendant for teaching or operating a robot, comprising:

a least one of data storage means for temporarily storing robot programs from a robot controller and means for reading a robot program within the robot controller one by one;

display data generating means for generating display data from said robot programs;

a display device for graphically displaying the display data generated by said display data generating means;

an operator panel for operating said robot; and an emergency stop button to stop movement of the robot.

2. A robot teaching pendant according to claims 1, which further comprises means for converting three-dimensional data of the robot programs into two-dimensional data which can be obtained by projecting the three-dimensional data in a specific viewing direction, in order to display the three-dimensional data in two dimensions on the screen of said display device.

3. A robot teaching pendant according to claim 2, wherein said display data include teaching data and taught points.

4. A robot teaching pendant according to claim 3, wherein said display data include data on a current position of the robot, besides the taught point data.

5. A robot teaching pendant according to claim 3, wherein said display data further include a tool coordinate system and at least one coordinate system from among a world coordinate system and a user coordinate system, along with coordinate axis data.

6. A robot teaching pendant according to claim 1, which further comprises shape data storage means for storing data representing shapes such as shapes of the robot, peripheral equipment, workpiece member, and the like.

7. A robot teaching pendant according to claim 1, wherein said teaching pendant has jog buttons and, said display data include data capable of graphically displaying the direction of action of robot corresponding to a depressed jog button therefor on the screen of the display device before or instead of operating said robot when the jog button is depressed.

8. A robot teaching pendant according to claim 1, which further comprises a key for starting the program to actuate the robot, and wherein said display data include data capable of graphically displaying the direction in which the robot starts to operate on the screen of the display device before the robot actually beings to move when the key is depressed.

9. A robot teaching pendant according to claim 8, which further comprises operation command generating means for generating an operation command for moving the robot to the position of one specified taught point when the one taught point, among the taught points displayed on the screen of said display device, is specified through a touch-panel.

10. A robot teaching pendant according to claim 1, wherein said display is a liquid crystal display device.

11. A robot teaching pendant for teaching or operating a robot, comprising:
   a least one of data storage means for temporarily storing robot programs from a robot controller and means for reading a robot program within the robot controller one by one;
   display data generating means for generating display data having teaching data from said robot programs;
   a display device for graphically displaying the display data generated by said display data generating means;
   an operator panel for operating said robot;
   means for converting three-dimensional data of the robot programs into two-dimensional data which can be obtained by protecting the three-dimensional data in a specific viewing direction, in order to display the three-dimensional data in two dimensions on the screen of said display device; and
   wherein said teaching data include data on taught points and data on the coordinate axes of a tool coordinate system for the tool center point (TCP) of the robot at each taught point.

12. A robot teaching pendant for teaching or operating a robot, comprising:
   a least one of data storage means for temporarily storing robot programs from a robot controller and means for reading a robot program within the robot controller one by one;
   display data generating means for generating display data from said robot programs;
   a display device having a touch panel on a display screen for graphically displaying the display data generated by said display data generating means; and
   an operator panel for operating said robot.

13. A robot teaching pendant for teaching or operating a robot, comprising:
   a least one of data storage means for temporarily storing robot programs from a robot controller and means for reading a robot program within the robot controller one by one;
   display data generating means for generating display data from said robot programs;
   a display device for graphically displaying the display data generated by said display data generating means;
   an operator panel for operating said robot; and
   movement plane specifying means for specifying a plane on which the taught points move, and operation command generating means which, specifying one of the taught points which are displayed on the screen of the display device by means of a touch-panel and also specifying the moving direction, cause the robot to move on the plane including said specified taught point, specified by said movement plane specifying means, in response to specifying operations of the taught points and moving direction.

14. A robot teaching pendant for teaching or operating a robot, comprising:
   a least one of data storage unit for temporarily storing robot programs from a robot controller and means for reading a robot program within the robot controller;
   display data generating unit for generating display data from said robot programs;
   a display device for graphically displaying the display data generated by said display data generating unit;
   an operator panel for operating said robot; and
   a plurality of jog buttons on said operator panel, wherein when one of said plurality of jog buttons is pressed an arrow appears on said display device indicating the direction of motion for said one of said plurality of jog buttons, whereby the motion of the robot may be seen on the display device before the robot actually operates.

15. A robot teaching pendant according to claim 14, which further comprises shape data storage unit for storing data representing shapes such as shapes of the robot, peripheral equipment, workpiece member, and the like.

16. A robot teaching pendant according to claims 14, which further comprises means for converting three-dimensional data of the robot programs into two-dimensional data which can be obtained by projecting the three-dimensional data in a specific viewing direction, in order to display the three-dimensional data in two dimensions on the screen of said display device.

17. A robot teaching pendant according to claim 16, wherein said display data include teaching data and taught points.

18. A robot teaching pendant according to claim 17, wherein said display data include data on a current position of the robot, besides the taught point data.

19. A robot teaching pendant according to claim 14, wherein said display data further include at least one coordinate system selected from among a tool coordinate system, world coordinate system, and a user coordinate system, along with coordinate axis data.

20. A robot teaching pendant for teaching or operating a robot, comprising:
   a hand-held portable housing having an emergency stop button to stop movement of the robot, comprising:
      a least one of data storage unit for temporarily storing robot programs from a robot controller and means for reading a robot program within the robot controller;
      display data generating unit for generating display data from said robot programs;
      a display device for graphically displaying the display data generated by said display data generating unit; and
      an operator panel for operating said robot.

* * * * *

UNITED STATES PATENT AND TRADEMARK OFFICE
CERTIFICATE OF CORRECTION

PATENT NO. :   5,937,143
DATED      :   August 10, 1999
INVENTOR(S):   Atsushi WATANABE, et al.

It is certified that error appears in the above-identified patent and that said Letters Patent is hereby corrected as shown below:

Title Page, Item 75, change "Oshino-mura" to
    --Minamitsuru-- both occurrences.
Item 73, change "Yamanashi" to --Minamitsuru--;
Col. 1, line 5, change "arid" to --and--;
Col. 1, line 17, change "su" to --so--;
Col. 7, line 4, "said" , second occurrence,
    begins new paragraph.

Signed and Sealed this

Fourth Day of April, 2000

Attest:

Attesting Officer

Q. TODD DICKINSON

Director of Patents and Trademarks